J. HILL, Sr.
ABRADING OR CUTTING DEVICE.
APPLICATION FILED JULY 13, 1911.
1,027,842.
Patented May 28, 1912.
2 SHEETS—SHEET 1.
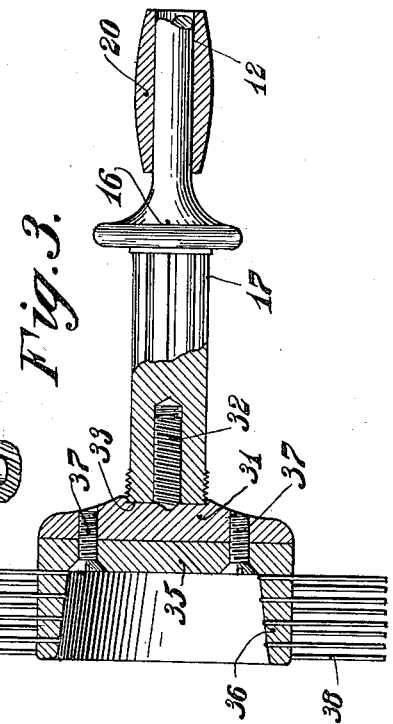
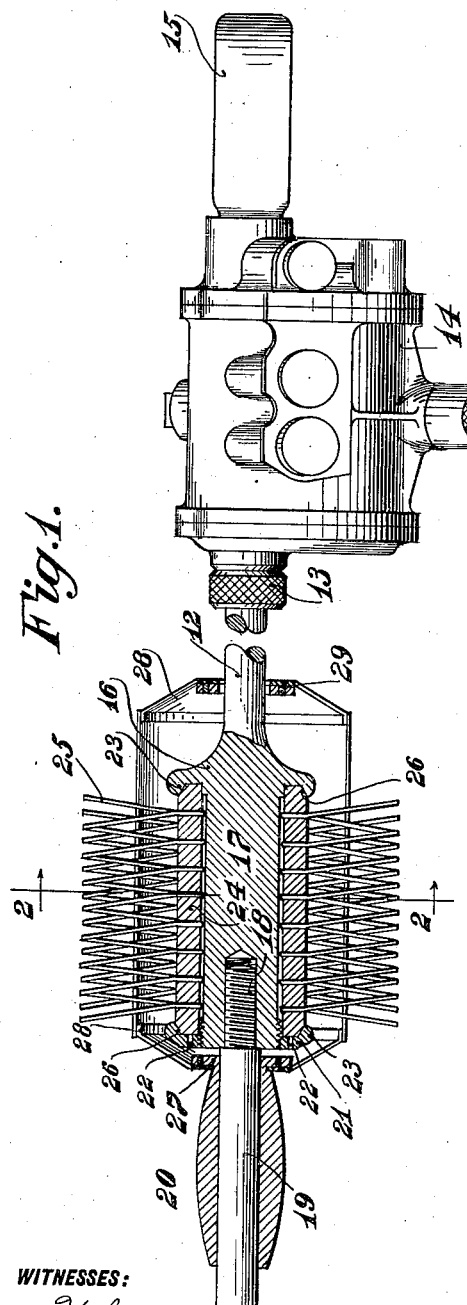
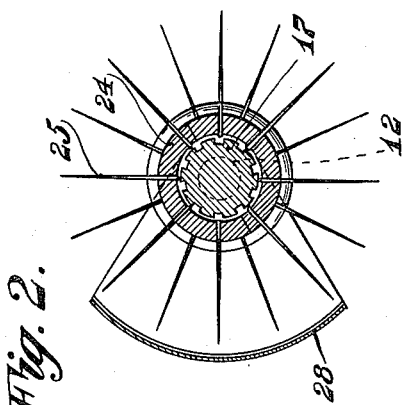
WITNESSES:
INVENTOR
ATTORNEY.

J. HILL, Sr.
ABRADING OR CUTTING DEVICE.
APPLICATION FILED JULY 13, 1911.

1,027,842.

Patented May 28, 1912.
2 SHEETS—SHEET 2.

WITNESSES:
Mae Hofmann
Howard S. Okie

INVENTOR
James Hill Sr
BY
Mo. Croasdale
ATTORNEY.

UNITED STATES PATENT OFFICE.

JAMES HILL, SR., OF CAMDEN, NEW JERSEY.

ABRADING OR CUTTING DEVICE.

1,027,842.  Specification of Letters Patent.  Patented May 28, 1912.

Application filed July 13, 1911. Serial No. 638,409.

*To all whom it may concern:*

Be it known that I, JAMES HILL, Sr., a citizen of the United States, residing at Camden, in the county of Camden and State of New Jersey, have invented a new and useful Abrading or Cutting Device, of which the following is a specification.

My invention relates to an improved abrading or cutting device.

It is, for example, especially adapted for removing rust from a ship's plates or for similar purposes.

It comprises abrading or cutting devices of special formation preferably interchangeably mounted upon an improved rotatable arbor or suitable supporting structure.

Figure 4:
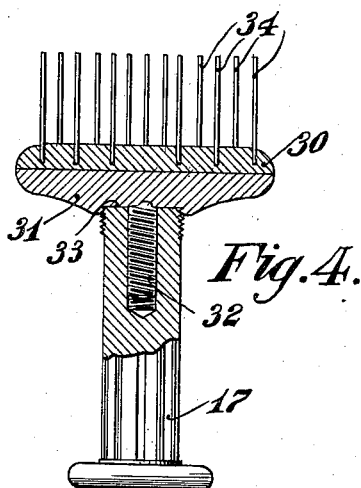
Figure 5:
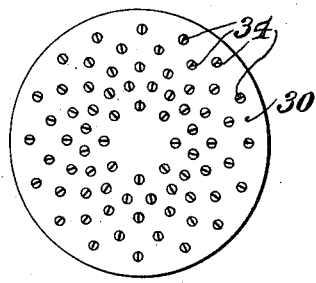
Figure 6:
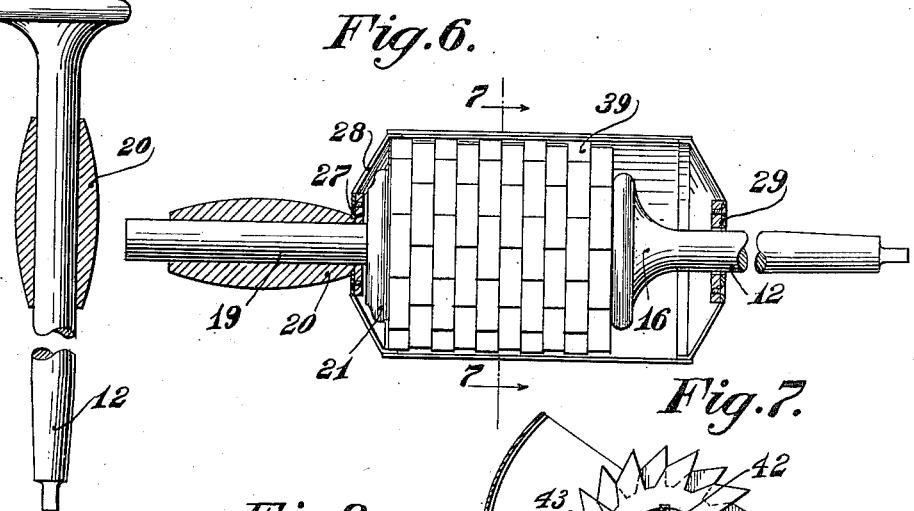
Figure 8:
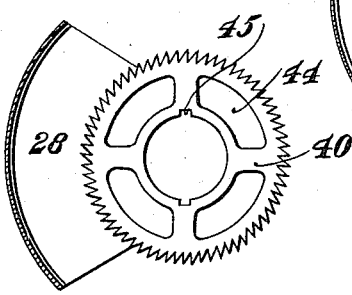
Figure 7:
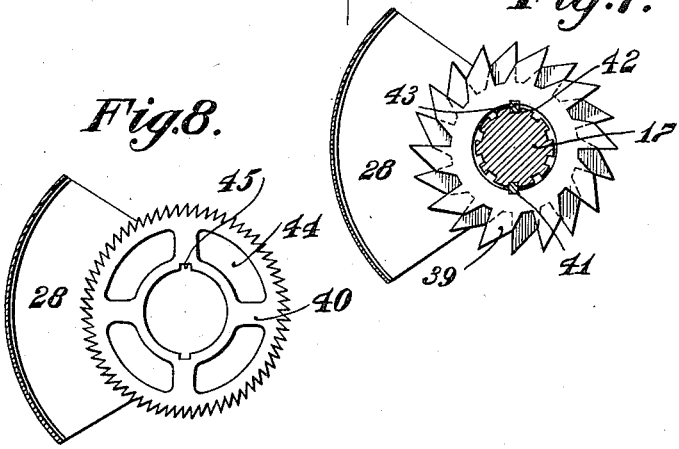

In the accompanying drawings, illustrating specific means and methods of employing my invention, Figure 1 is a front elevation partly in section, of my device equipped with one form of metal brush, the guard for the same being shown turned to the work engaging side of the device so as not to obscure the brush and other parts, in the drawing. Fig. 2 is a cross section on line 2—2 of Fig. 1. Fig. 3 is a view partly in section of another form of brush and associated parts. Fig. 4 is a view similar to Fig. 3 of another form of brush. Fig. 5 is a plan view of the brush shown in Fig. 4. Fig. 6 is an elevation of my device equipped with a series of circular steel cutting disks or scrapers. Fig. 7 is a section on line 7—7 of Fig. 6. Fig. 8 is an elevation of a different form of cutting disk from that shown in Figs. 6 and 7.

Similar numerals refer to similar parts throughout the several views.

In the drawings, referring especially to Fig. 1, one end of a shaft or mandrel 12 is operatively connected by a Morse taper socket 13 with the portable air motor 14 provided with handle 15. The other end of mandrel 12 is provided with shoulder 16 and is rigidly secured to one end of member or arbor 17. The other end of arbor 17 has a longitudinally disposed opening 18, provided with a left hand thread. One end of a member or extension 19 is threaded into opening 18.

Handle 20 is loosely mounted upon the other end of member or extension 19 which turns freely within said handle, extension 19 and sleeve 20 forming a removable handle at the end of the device opposite handle 15. Collar 21 is provided with a left hand thread and is adapted to be secured to the same end of arbor 17 as member 19. This collar is provided with keyways 22 to aid if necessary in its removal from the arbor. Upon the inner faces of shoulder 16 and collar 21 are provided the flanges 23.

The brush 24 is securely clamped between shoulder 16 and collar 21 and revolves with member 17, shafts or mandrel 12 and member 19, shoulder 16 and collar 21. The body portion of this brush is preferably of metal and is usually made in two or more sections for convenience in securing tines or bristles 25 thereto, and to facilitate its removal from arbor 17. The ends of the body portion of the brush are beveled as shown at 26 so as to insure a tight fit between shoulder 16 and collar 21 and said brush.

In the drawings I have shown this brush as having 16 rows of tines, each row comprising either seven or eight sets of four tines each, arranged in pairs in V-shaped form. These sets of four tines each are staggered with the sets of four in adjacent rows, all as clearly shown in Figs. 1 and 2, and are so positioned that the outer ends of each pair of tines or bristles making up the different sets, with the exception of the pairs of tines at the extreme ends of each row, intersect the outer ends of the adjacent pair of tines in each adjacent set in the same row.

Secured at one end to part 27 of handle 20 is guard 28. This guard surrounds brush 24 for approximately one-third of the circumference of the brush. It is provided at its other end with ring 29 through which mandrel 12 extends. This device is adapted to be grasped by handles 15 and 20 and held with the ends of tines 25 in engagement with the work, guard 28 being interposed between the person and the revolving brush.

The device shown in Figs. 4 and 5 is adapted primarily for use on overhead work. It will be understood that all of these devices are made interchangeable so far as possible, and that either brush 30, shown in Figs. 4 and 5, or brush 35, shown in Fig. 3, may be employed at the same time as brush 24 if desired, as will appear. To connect up brush 30 in place of brush 24, mandrel 12 is withdrawn from socket 13, guard 28 is disconnected from part 27 of handle 20 and extension 19 is withdrawn from opening 18. Collar 21 is removed from arbor 17, brush 24 is removed from the arbor and from within guard 28 in sections, and the guard is removed over the end of mandrel 12. Disk 31, provided with shank 32 having a left hand thread and adapted to fit opening 18, is secured to arbor 17. This disk has a circular opening 33 adapted to receive the end of the arbor to insure a tight connection between the parts. Brush 30 is secured to disk 31 by screws or bolts, not shown in Figs. 4 and 5, and handle 20 is transferred from member 19 to mandrel 12. Mandrel 12 is again connected with the source of power through socket 13, and the device is ready for operation.

The arrangement of tines 34 of brush 30 is shown in Fig. 5. These tines are arranged in sets, in circles, each set comprising four tines arranged in pairs in V-shaped form as in brush 24. As these sets of tines approach the center of the brush they are spaced more closely together. As they approach the periphery they are suitably staggered.

Brush 35 shown in Fig. 3, is adapted primarily for use in corners. The formation of this brush is such that it is especially adapted for such work. It comprises a circular disk portion provided with flanges 36, and is adapted to be secured by screws or bolts 37 to the face of disk 31. Tines 38 of the brush 35 extend outwardly from flanges 36 at right angles thereto. The connection between the brush and arbor 17 and the source of power is the same as that of brush 30 shown in Fig. 4. Both brushes are adapted to be secured to the face of the same disk 31. It will be obvious that guard 28 will be unnecessary in the operation of brushes 30 and 35, and that by dispensing with the guard in the form of my invention shown in the drawings and simply inserting shank 32 of disk 31 into opening 18 in place of member 19, the device may be operated with either brush 30 or 35 operating in connection with brush 24. It also is obvious that by a suitable adjustment of collar 21 relatively to the threaded end of arbor 17, disk 31 may be secured to the end of the arbor in the manner shown in Fig. 3.

The tines of the metal brushes are preferably resilient. Upon engaging with projections upon the work, they yield sufficiently in the direction of travel of the brush to enable the same to continue running smoothly, or without hopping away from the surface of the plates. When the tines have passed the projection they spring back into their normal operative positions. These metal brushes are of great efficiency in removing rust, especially from metal plates, around the heads of bolts etc. where its removal heretofore has only been accomplished with the expenditure of much time and labor.

Where the coating of rust or other substance is very hard or thick I have found it advantageous to employ a series of circular steel cutting disks, such for example, as toothed disks 39 and 40, shown in Figs. 7 and 8 respectively. In Fig. 6 a series of toothed disks comprising ten of cutting disks 39, is shown in position upon arbor 17, which is driven by mandrel 12, as in the device shown in Fig. 1, and is provided with member 19, handle 20, shoulder 16 and collar 21 in engagement with the two end disks, and guard 28. Each cutting disk 39 is provided with keyways 41 adapted to register with keyways 42 of arbor 17. The cutting disks are secured to the arbor by keys 43, and are preferably arranged with the cutting teeth or blades of adjacent disks in staggered relation, as shown in Fig. 6. The modified form of circular steel cutting disk 40, shown in Fig. 8, is adapted to be used with lighter work and has a part of its frame cut away as at 44 to lighten the structure.

In Fig. 7 I have shown arbor 17 provided with ten keyways. It will be obvious that only one of these keyways will be necessary for securing the series of cutting disks thereto if the keyways 41 and 45 of disks 39 and 40 respectively, are properly arranged with respect to the keyway in the arbor. The object of providing extra keyways is to afford means for securing a series of separate cutting blades or scrapers, not shown, to the arbor, each blade extending substantially across the arbor and secured at its base within the keyways therein. It will be understood that these cutting devices may also be mounted upon disks so as to operate in the same positions as brushes 30 and 35 and that they may be interchangeable with brushes 24, 30 and 35.

It will thus be seen that I have not only devised an apparatus for effectively accomplishing the desired result, but that as the different work engaging elements or members are all interchangeable and adapted to be operated from a common source, namely mandrel 12 and arbor 17, the operation of the different devices is effectively accomplished with a minimum of trouble and expense.

What I claim is:—

1. In a device of the character described, the combination of a plurality of differently formed abrading elements for operating in different locations or at different angles, and a single rotatable arbor adapted to simultaneously support a plurality of said abrading elements, one upon the longitudinal extension of said arbor and another at the extreme end thereof.

2. In a device of the character described, the combination of a plurality of differently formed and interchangeable abrading elements, and a single rotatable arbor adapted to support said abrading elements, said arbor having a removable guard connected therewith and a removable handle, and means for securing an abrading element to the arbor in place of the handle.

3. In a device of the character described, the combination of a plurality of differently formed abrading elements for operating in different locations or at different angles, a rotatable arbor adapted to simultaneously support a plurality of said abrading elements, a removable guard and a removable handle, said handle being interchangeable with an abrading element.

4. In a device of the character described, the combination of a plurality of differently formed abrading elements for operating in different locations or at different angles, and a rotatable arbor adapted to support said abrading elements either upon its longitudinal extension or at the extreme end thereof.

5. In a device of the class described, the combination of a rotatable mandrel, an arbor operatively connected therewith, a series of toothed disks keyed thereto and adapted to rotate therewith, said disks being arranged with the teeth of adjacent disks in staggered relation, a removable handle, a guard partially surrounding said disks, a guard support, and means for rotating the mandrel and the arbor.

6. In a device of the class described, the combination of a rotatable shaft, an arbor having one end operatively connected therewith, a work engaging element comprising a plurality of separable sections provided with cutting or scraping surfaces, operatively connected with the arbor, a detachable member connected with the end of the arbor opposite to the end connected with the rotatable shaft, a handle loosely mounted upon said member, a removable collar connected with the arbor between the handle and the work engaging element, and a guard secured at one end to the handle and having a ring at the other end through which the rotatable shaft extends and within which it freely turns.

7. In a device of the class described, the combination of an arbor having a longitudinal opening therein, a work engaging element mounted upon the arbor and provided with a plurality of radially extending cutting or scraping elements, a rotatable shaft provided at one end with a shoulder and connected with the arbor and with the source of power, a shaft threaded in the opening in the arbor in the same direction as the rotation of the arbor, a handle upon said shaft provided with an aperture for the shaft, a guard secured to said handle, and a collar secured to the end of the arbor between the handle and the work engaging element.

8. In a device of the class described, the combination of a rotatable member adapted to support a removable work engaging element, a removable extension, having a handle loosely mounted thereon, and a second removable work engaging element adapted to be operatively connected with said rotatable member, said extension and last mentioned work engaging element being interchangeable, as and for the purpose specified.

9. In a device of the class described, the combination of a mandrel, an arbor having a rigid relationship therewith at one end, a removable rotatable member at the other end of the arbor provided with a normally stationary handle, and a plurality of abrading elements adapted to be simultaneously connected with the arbor, said arbor and removable rotatable member having a threaded relationship, as and for the purpose specified.

10. In a device of the class described, the combination of a rotatable mandrel and a single arbor having a rigid relationship therewith at one end and a removable member at the other end.

11. In a device of the class described, the combination of a shaft, an arbor secured thereto at one end and adapted to simultaneously support a number of differently formed and interchangeable work engaging members thereon, a removable member at the other end of the arbor, and means for connecting a work engaging member to the arbor in place of said rotatable member.

12. In a device of the class described, the combination of a rotatable shaft, an arbor connected therewith, a shoulder, a plurality of abrading elements comprising a series of toothed metal disks slidably mounted on the arbor and arranged with their adjacent faces in contact, means for establishing a clamping relationship between the toothed disks and the shoulder, comprising a removable collar having a threaded relationship with the arbor, and means for locking the toothed disks in the clamped position.

JAMES HILL, Sr.

Witnesses:
ANDREW HATZ,
ROBERT B. TETELA.